(12) United States Patent
Redmond et al.

(10) Patent No.: US 6,675,457 B1
(45) Date of Patent: Jan. 13, 2004

(54) METHOD FOR MANUFACTURING A ONE-PIECE TORSIONAL VIBRATION DAMPER RETAINER PLATE

(75) Inventors: Daniel W. Redmond, Lathrup Village, MI (US); William Ross, Warren, MI (US)

(73) Assignee: Tesma International Inc., Concord (CA)

(*) Notice: Subject to any disclaimer, the term of this patent is extended or adjusted under 35 U.S.C. 154(b) by 0 days.

(21) Appl. No.: 09/787,464

(22) PCT Filed: Sep. 15, 1999

(86) PCT No.: PCT/US99/21035

§ 371 (c)(1),
(2), (4) Date: Sep. 14, 2001

(87) PCT Pub. No.: WO00/15368

PCT Pub. Date: Mar. 23, 2000

(Under 37 CFR 1.47)

Related U.S. Application Data

(60) Provisional application No. 60/100,607, filed on Sep. 16, 1998.

(51) Int. Cl.[7] ............................................. B21D 39/00
(52) U.S. Cl. ..................... 29/509; 29/889.5; 29/DIG. 21
(58) Field of Search .............................. 192/3.28, 3.29, 192/3.3, 212; 464/66, 67; 29/509, 889.5, 896.91, 896.93, 898.063, 898.065, 898.066, 898.067, DIG. 21

(56) References Cited

U.S. PATENT DOCUMENTS

| | | | |
|---|---|---|---|
| 2,219,591 A | * 10/1940 | Hiester | |
| 2,221,800 A | * 11/1940 | Johnson | ...................... 192/212 |
| 3,964,412 A | * 6/1976 | Kitsuda | |
| 4,139,995 A | 2/1979 | Lamarche | |
| 4,449,621 A | * 5/1984 | F'Geppert | |
| 4,890,706 A | 1/1990 | Miura et al. | |
| 4,903,803 A | 2/1990 | Koshimo | |
| 4,908,924 A | 3/1990 | Tsuruta et al. | |
| 5,209,330 A | * 5/1993 | Macdonald | ............... 464/67 X |
| 5,947,243 A | * 9/1999 | MacDonald | ............... 192/3.29 |
| 5,964,328 A | 10/1999 | Fallu et al. | |

* cited by examiner

*Primary Examiner*—Greg Binda
(74) *Attorney, Agent, or Firm*—Clark Hill PLC

(57) ABSTRACT

A method for manufacturing a drive plate or one-piece torsional vibration damper retainer plate (20) for a torque converter (26) is disclosed. The retainer plate includes an annular periphery (36) curled into a generally C-shaped channel (46) for retaining at least one spring (56). The method includes the following steps. First, the retainer plate (20) is stamped primarily to form a central plate segment (34), an annular periphery (36), and a hub opening (44). Next, the annular periphery of the retainer plate is pre-curled. The plate is then heat treated to enhanced the physical properties of the retainer plate. The spring is disposed within the pre-curled annular periphery. Finally, the annular periphery of the retainer plate is completely curled into the generally C-shaped channel to substantially surround the spring thereby preventing the spring from being removed from the C-shaped channel of the retainer plate during operation of the retainer plate.

10 Claims, 4 Drawing Sheets

METHOD FOR MANUFACTURING A ONE-PIECE TORSIONAL VIBRATION DAMPER RETAINER PLATE

RELATED APPLICATIONS

This application claim all the benefits and priority to U.S. provisional application No. 60/100,607, filed on Sep. 16, 1998.

BACKGROUND OF THE INVENTION

1) Technical Field

The subject invention relates to a method for manufacturing a one-piece torsional vibration damper retainer plate for operation in a torque converter.

2) Description of the Prior Art

Torsional vibration dampers are well known components in torque converters. As appreciated, torque converters operate as a fluid coupling between an output of an engine and an input of a transmission of a vehicle. Additionally however, torque converters implement torsional vibration dampers as lock-up clutches to dampen or reduce torsional vibrations generated between the engine and the transmission of the vehicle during the mechanical engagement of the lock-up clutch, or torsional vibration damper.

Specifically, torsional vibration dampers include a driven or retainer plate and a drive plate. Referring to the prior art retainer plate 100 of a conventional torsional vibration damper (not shown) detailed in FIG. 1, the retainer plate 100 includes a central plate segment 102 and an annular periphery 104 having a distal end 106. The annular periphery 104 of the retainer plate 100 extends upwardly at approximately 90° from the central plate segment 102. As such, a generally L-shaped channel 108 is established between the central plate segment 102 and the annular periphery 104. Continuing, a plurality of compression springs 110, critical to the dampening function of the torsional vibration damper, are disposed in the generally L-shaped channel 108. To retain the spring 110 in the L-shaped channel 108, a plurality of spring support brackets 112 are mounted to the central plate segment 102. The requirement of incorporating the plurality of spring support brackets 112 to assist in retaining the springs in the generally L-shaped channel 108 is disadvantageous as will be realized further hereinbelow.

More specifically, the spring support brackets 112 include a support segment 114 and a distal retention segment 116. For support purposes, the support segment 114 of each spring support bracket 112 is rigidly mounted to the central plate segment 102 of the retainer plate 100. Further, the distal retention segment 116 of each spring support bracket 112 angularly extends toward the distal end 106 of the annular periphery 104 thereby spanning the generally L-shaped channel 108 to retain the springs in the generally L-shaped channel 108 during assembly and operation of the torsional vibration damper.

The incorporation of the spring support brackets 112 contribute additional material, additional weight, and additional costs to the retainer plate 100 of the torsional vibration damper.

A second conventional torsional vibration damper is disclosed in U.S. Pat. No. 4,903,803 (the '803 patent) to Koshimo. The '803 patent discloses a conventional torsional vibration damper including a driven or retainer plate and a drive plate. As with the retainer plate disclosed in FIG. 1, the retainer plate of the '803 patent also includes a central plate segment and an annular periphery having a distal end. The annular periphery of the retainer plate in the '803 patent is partially curled to establish a generally C-shaped channel between the central plate segment and the annular periphery. Continuing, a plurality of compression springs are disposed in the generally C-shaped channel for dampening torsional vibrations. Although the annular periphery of the retainer plate in the '803 patent is curled to establish a generally C-shaped channel, the annular periphery is only partially curled. As such, the annular periphery of the '803 patent is not sufficiently curled to independently retain the springs in the generally C-shaped channel, and the retainer plate of the '803 patent only operates in conjunction with the drive plate to retain the springs.

Instead of independently retaining the springs, the '803 patent must additionally incorporate vertical support walls stamped out of the retainer plate. The stamping of the vertical support walls adds time to the manufacture of the retainer plate. Further, the stamping of the vertical walls directly out of the retainer plate necessarily forms "openings" dispersed throughout a circumference of the retainer plate thereby detracting from the overall structural integrity of the retainer plate in the '803 patent.

Also because the annular periphery of the '803 patent is only partially curled, the drive plate that interacts with retainer plate must include supplemental construction at an outer periphery of the drive plate to assist the retainer plate in retaining the springs during operation of the torsional vibration damper by encompassing at least a portion of a circumference of the springs. In sum, similar to retainer plate disclosed in FIG. 1, the retainer plate disclosed in the '803 patent must additionally incorporate vertical support walls that detract from the overall structural integrity of the retainer plate, and the drive plate disclosed in the '803 patent must additionally incorporate supplemental construction at the outer periphery which contributes additional material, additional weight, and additional costs to the drive plate of the torsional vibration damper.

Due to the inefficiencies identified in such conventional torsional vibration dampers, it is desirable to implement a method for manufacturing a driven or retainer plate that retains at least one spring without any additional components.

SUMMARY OF THE INVENTION AND ADVANTAGES

A method for manufacturing a one-piece torsional vibration damper retainer plate having an annular periphery curled into a generally C-shaped channel for retaining at least one spring comprises the step of disposing the spring about the annular periphery of the retainer plate. The method further comprises, and is characterized by, the step of curling the annular periphery of the retainer plate into the generally C-shaped channel to substantially surround the spring to prevent the spring from being removed from the C-shaped channel of the retainer plate during operation of the retainer plate. As appreciated, the generally C-shaped channel may retain more than one spring. That is, the annular periphery of the retainer plate may be curled into a generally C-shaped channel for retaining a plurality of springs. Continuing, the step of curling the annular periphery is further defined by first partially curling the annular periphery to receive the spring or springs and thereafter completing the curling of the annular periphery about the spring or springs. Additionally, the method incorporates the step of heat treating the retainer plate to change physical properties of the retainer plate between the step of partially curling the annular periphery and the step of completing the curling of the annular periphery.

Accordingly, the subject invention provides a method for manufacturing a driven or retainer plate having an annular periphery curled into a generally C-shaped channel that substantially surrounds at least one spring to prevent the spring from being removed from the C-shaped channel of the retainer plate during operation of the retainer plate. As a result, the retainer plate manufactured according to the subject invention independently retains the spring in the generally C-shaped channel thereby requiring less material, less weight, and less cost than the conventional retainer plates of the prior art.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 3:
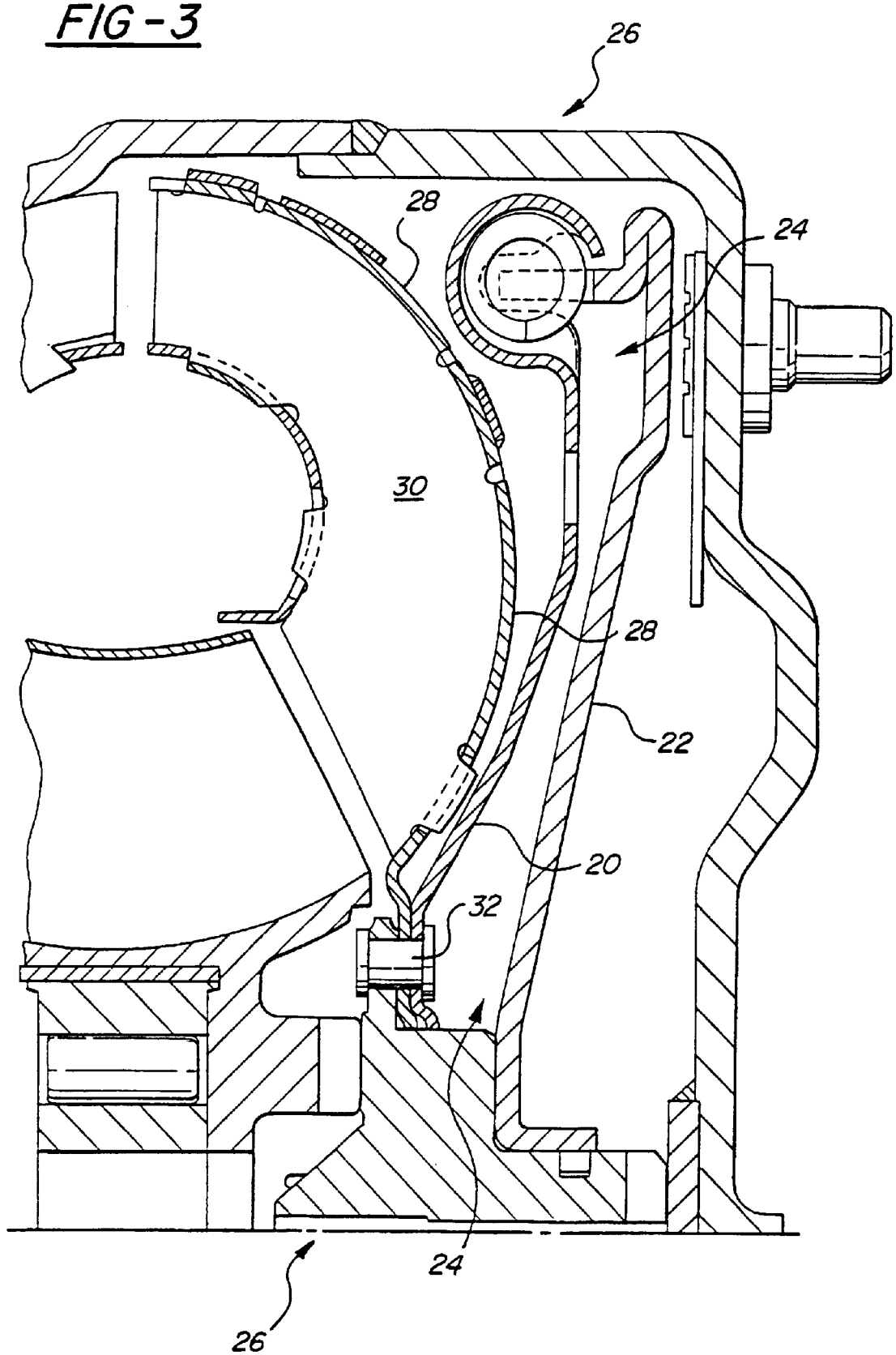
FIG. 3 is a fragmentary cross-sectional view generally illustrating the retainer plate of the subject invention in a torque converter of a vehicle.

Referring to the Figures, wherein like numerals indicate like or corresponding parts throughout the several views, a driven plate or one-piece torsional vibration damper retainer plate, manufactured according to the subject invention is generally shown at 20. Referring initially to FIG. 3, the retainer plate 20 manufactured according to the subject invention mechanically interacts with a drive plate 22 to establish a torsional vibration damper assembly 24. The torsional vibration damper assembly 24 is integrally disposed within a torque converter 26 of a vehicle (not shown in the Figures). The retainer plate 20, more specifically, is mounted to an outside facing 28 of a turbine 30 of the torque converter 26 via a rivet 32. As appreciated, the retainer plate 20 may be mounted to the turbine 30 in other manners including, but not limited to, welding or mounting the retainer plate 20 via a nut and bolt. Although not specifically shown in FIG. 3, the turbine 30 of the torque converter 26 receives a forced fluid from an impeller of the torque converter 26 to ultimately drive or turn an input shaft of a transmission of the vehicle.

Figure 1:
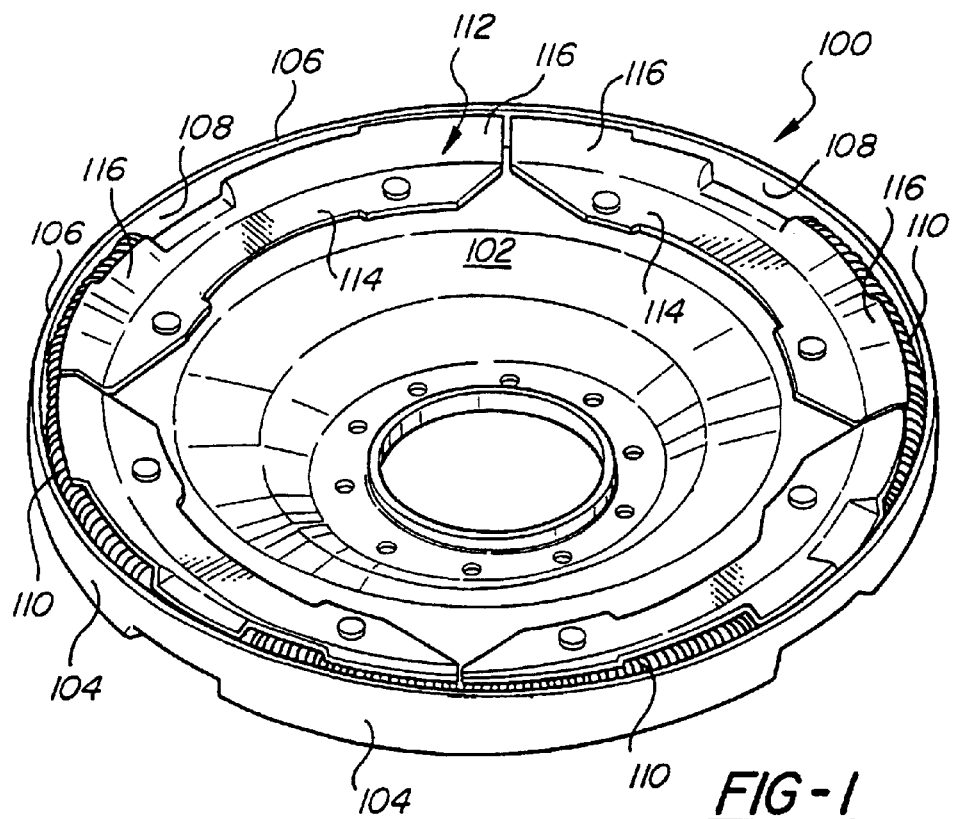
FIG. 1 is perspective view illustrating a conventional retainer plate.
Figure 2:
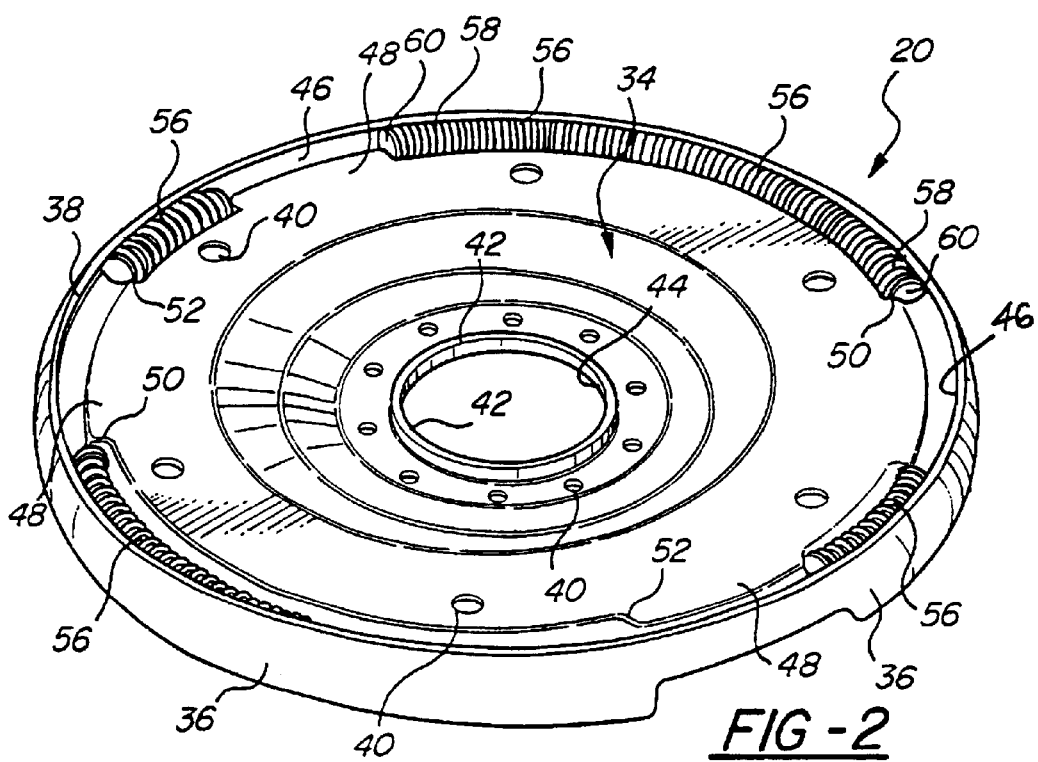
FIG. 2 is a perspective view illustrating a retainer plate of the subject invention having an annular periphery curled into a generally C-shaped channel to substantially surround at least one spring.

Referring now to FIG. 2, the retainer plate 20 is a generally disc-shaped unitary stamping of steel including a central plate segment 34 and an annular periphery 36 having a distal end 38. As appreciated, the central plate segment 34 of the retainer plate 20 provides structural support to the retainer plate 20. The central plate segment 34 includes a plurality of apertures 40 for receiving rivets, or other fasteners necessary to properly secure the retainer plate 20 within the torque converter 26. The central plate segment 34 terminates at a central interior rim 42 thereby forming a hub opening 44 of the retainer plate 20.

Continuing, the annular periphery 36 of the retainer plate 20 is curled to form a generally C-shaped channel 46. The generally C-shaped channel 46 may be otherwise fairly characterized as a generally semi-circular-shaped channel, a generally cup-shaped channel, or a generally ring-shaped channel. With reference to the central plate segment 34 and the generally C-shaped channel 46, a plurality of offset sections 48 protrude from the central plate segment 34 into the generally C-shaped channel 46. Each of the plurality of offset sections 48 includes first 50 and second 52 ends defining radially extending abutment walls 54 (best shown in FIG. 12) within the generally C-shaped channel 46.

Figure 12:
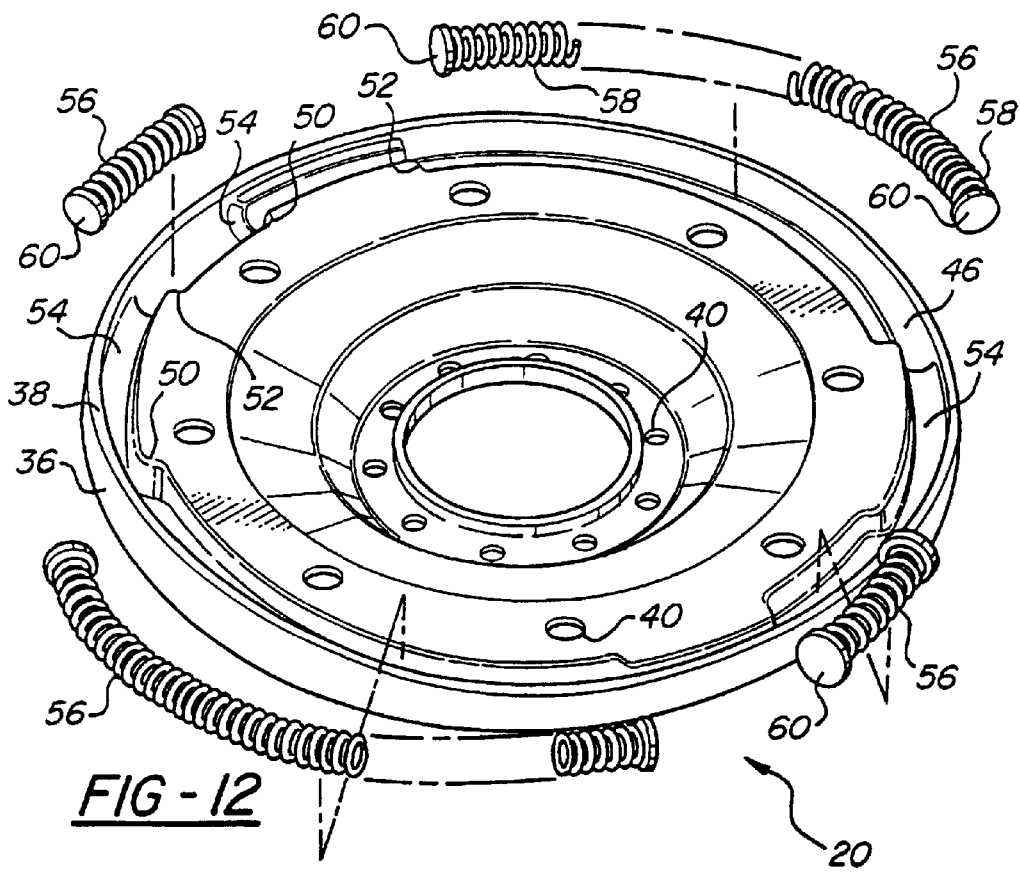
FIG. 12 is a partially exploded perspective view illustrating the annular periphery of the retainer plate partially curled and representing the springs in spaced-relationship thereto.

The generally C-shaped channel 46 of the retainer plate 20 independently retains at least one spring 56. As appreciated, the spring 56 includes spring ends 58 having spring seats 60 that are integrally disposed within each end 58 of the spring 56 for properly seating the spring 56 in the generally C-shaped channel 46. More specifically, the spring 56 is independently retained in the generally C-shaped channel 46 of the retainer plate 20 between the radially extending abutment walls 54. The spring 56 utilized in the subject invention preferably includes, but is not limited to, a compression spring. Also, the spring 56 utilized in the subject invention may be of varying lengths depending on specific requirements of the damper assembly 24. As shown specifically in FIGS. 2 and 12, the generally C-shaped channel 46 of the retainer plate 20 may retain a plurality of springs 56 without varying the scope of the invention. The independent retention of the spring 56 or the plurality of springs 56 within the generally C-shaped channel 46 will be understood more completely herein below. Also as shown in FIGS. 2 and 12, there are preferably four springs 56 retained in the generally C-shaped channel 46 of the retainer plate 20 whereby two of the four springs 56 have a larger length than the other two of the of the four springs 56 in accordance with performance requirements of the particular damper assembly 24.

Figure 4:
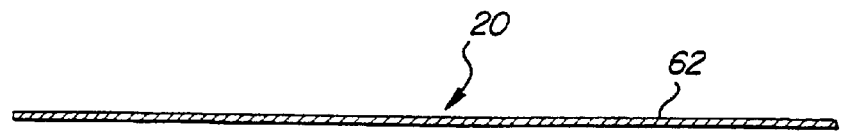
FIG. 4 is a partially cross-sectional schematic view of a blank of the retainer plate according to the method of the subject invention.
Figure 5:
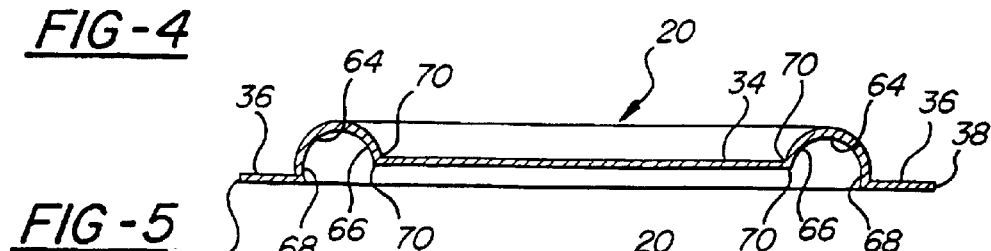
FIG. 5 is a partially cross-sectional schematic view of the retainer plate stamped to form a central plate segment, a circumferential groove, and an annular periphery.

A method for manufacturing the one-piece torsional vibration damper retainer plate 20 having the annular periphery 36 curled into the generally C-shaped channel 46 for retaining at least one spring 56 comprises the steps that follow and that are represented in FIGS. 4 through 13. As represented in FIG. 4, the method includes an initial blanking operation to generate a blank 62 by stamping a predetermined size, diameter, and general shape of the retainer plate 20 from a coil of steel such as a 1020 steel with carbon. As represented in FIG. 5, after the blank 62 is formed, the retainer plate 20 is stamped to form the central plate segment 34 and a circumferential groove 64 having radially-spaced inner 66 and outer 68 walls extending about the central plate segment 34. As appreciated, the stamping of the retainer plate 20 is generally a soft stamping process where particular attention is payed to not tear or otherwise damage any surface of the retainer plate 20. As a result, the step of stamping the retainer plate 20 to form the central plate segment 34 may additionally incorporate a re-striking step or steps to form finished dimensions of both the central plate segment 34 and the circumferential groove 64.

Continuing, the stamping of the retainer plate 20 is further defined by forming the radially extending abutment walls 54 within the circumferential groove 64 for positioning the spring 56 or springs 56 about the circumferential groove 64. For illustrative purposes, the radially extending abutment walls 54 are not shown in FIGS. 5 through 11. During the stamping, an integral corner 70 is formed which extends about the central plate segment 34 and into the inner wall 66 of the circumferential groove 64. Also during the stamping, the annular periphery 36 is formed which extends radially from the outer wall 68 of the circumferential groove 64.

Figure 6:
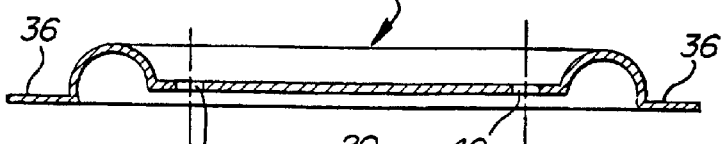
FIG. 6 is a partially cross-sectional schematic view of the retainer plate pierced to form a plurality of apertures in the central plate segment.
Figure 7:
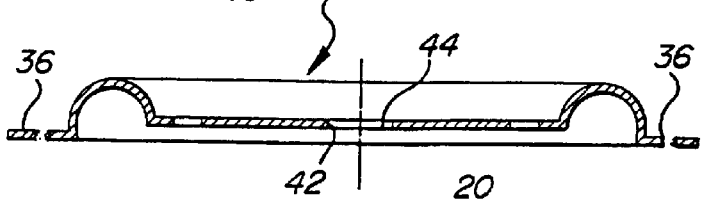
FIG. 7 is a partially cross-sectional schematic view of the retainer plate trimmed to a final diameter and pierced to form a central interior rim and hub opening.

With reference to FIG. 6, the method continues to include a first piercing step to pierce the plurality of apertures 40 in the central plate segment 34 of the retainer plate 20. The method may include other similar piercing steps as required to form other apertures needed for mounting of the retainer plate 20 at various locations within the torque converter 26. For example, with reference to FIG. 7, the method includes the additional piercing step to form the central interior rim 42 thereby forming the hub opening 44 of the retainer plate 20. As also shown in FIG. 7, the subject method incorporates a step to 'trim' the annular periphery 36 of the retainer plate 20 to a predetermined final diameter. As appreciated, the final diameter of the annular periphery 36 is predetermined based on geometry of the springs 56 ultimately disposed in the generally C-shaped channel 46.

Figure 8:
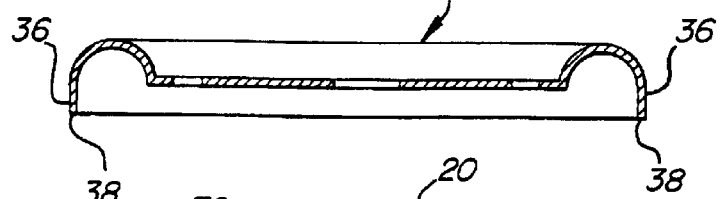
FIG. 8 is a partially cross-sectional schematic view of the retainer plate with the annular periphery wiped to extend from the circumferential groove.

Referring now to FIG. 8, the method further includes the step of wiping the annular periphery 36 to extend the periphery 36 axially as an extension of the outer wall 68 of the circumferential groove 64. In other words, the annular periphery 36 is bent from a horizontal position (FIG. 7) to a vertical position (FIG. 8). After the step of wiping the annular periphery 36, the method continues by partially curling the distal end 38 of the annular periphery 36 as represented by A in FIG. 13 and shown generally in FIG. 9. This partial curling of the annular periphery 36 will be described more completely herein below. Next, with reference to both FIG. 10, the method continues by adapting the central plate segment 34 to form a center step 72 about the hub opening 44 of the retainer plate 20, and by piercing additional apertures as needed.

Referring now to FIG. 12, the method next includes the step of disposing the spring 56 about the annular periphery 36 of the retainer plate 20. More specifically, the step of disposing the spring 56 about the annular periphery 36 is further defined by disposing a plurality of springs 56 about the annular periphery 36 of the retainer plate 20. As discussed above, disposing the plurality of springs 56 about the annular periphery 36 does not influence the scope of the subject invention and, for convenience in describing, the method will be described further in terms of the plurality of springs 56.

Figure 13:
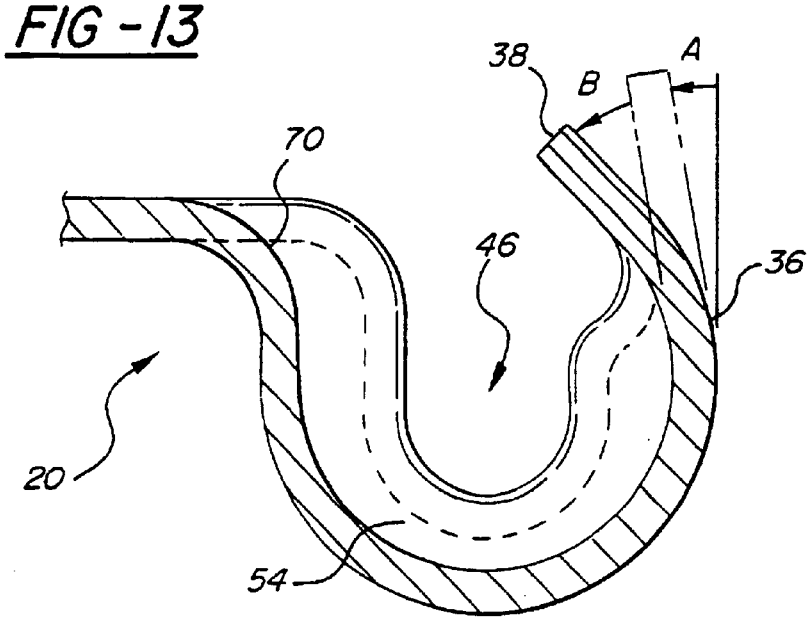
FIG. 13 is an enlarged fragmentary cross-sectional view illustrating the annular periphery of the retainer plate partially curled and completely curled.

Continuing, the method, with reference to FIG. 13, is characterized by curling the annular periphery 36 into the generally C-shaped channel 46 to substantially surround the springs 56 to prevent the springs 56 from being removed from the C-shaped channel 46 of the retainer plate 20 during operation of the retainer plate 20. More specifically, the step of curling the annular periphery 36 is further defined by partially curling the annular periphery 36 (see A in FIG. 13) to receive the springs 56 and thereafter completing the curling of the annular periphery 36 (see B in FIG. 13) about the springs 56. This will be described further herein below.

Figure 9:
FIG. 9 is a partially cross-sectional schematic view of the retainer plate with the annular periphery partially curled.
Figure 10:
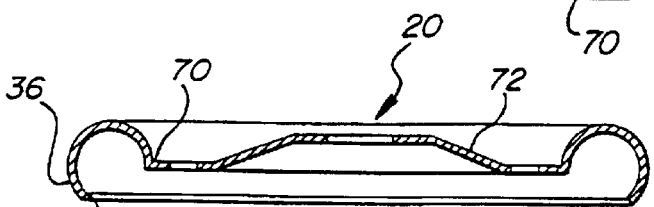
FIG. 10 is a partially cross-sectional schematic view of the retainer plate stamped to form a center step about the hub opening.

As introduced immediately above, the curling of the annular periphery 36 more specifically includes a first step of partially curling the annular periphery 36, and a second step of completing the curling of the annular periphery 36 about the springs 56. The first step of partially curling the annular periphery 36 is represented in FIGS. 9, 12, and 13. As FIG. 9 shows, the method further includes the step of partially curling the annular periphery 36 toward the integral corner 70. In particular, this step occurs prior to disposing the springs 56 within circumferential groove 64. However, as FIG. 12 shows, after the annular periphery 36 is partially curled, the springs 56 are then disposed within the circumferential groove 64. As discussed above, FIG. 13 represents the partial curling of the annular periphery at A.

Furthermore, after the annular periphery 36 is partially curled, the method includes the step of heat treating the retainer plate 20 to change the physical properties of the retainer plate 20 between the step of partially curling the annular periphery 36 and the step of completing the curling of the annular periphery 36. More specifically, as the retainer plate 20 is heat treated, the steel of the retainer plate 20 is hardened to improve the structural integrity of the retainer plate 20 and, in particular, the annular periphery 36 prior to the step of completing the curling of the annular periphery 36. The heat treating process enables the step of completing the curling of the annular periphery without permanent damage to the annular periphery such as tearing or complete breaking.

Also, between the step of partially curling the annular periphery 36 and the step of completing the curling of the annular periphery 36, the method preferably incorporates steps of deburring and cleaning the retainer plate 20. These additional steps are preferred in order promote clean and safe handling of the retainer plate 20 in preparation for shipping.

Figure 11:
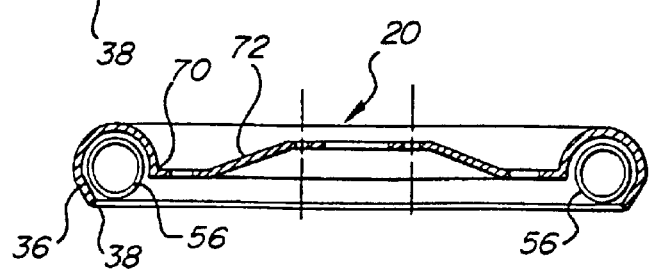
FIG. 11 is a partially cross-sectional schematic view of the retainer plate with the annular periphery finally curled independently retaining the spring.

As discussed above, after the annular periphery 36 is partially curled, but before the step of completing the curling of the annular periphery 36, the springs 56 are disposed about the annular periphery 36. As shown in FIG. 11, after the springs 56 are disposed about the partially-curled annular periphery 36, the annular periphery 36 is finally curled into the generally C-shaped channel 46 to substantially surround the springs 56 to prevent the springs 56 from being removed from the C-shaped channel 46 of the retainer plate 20 during operation of the retainer plate 20. More specifically, the second step of completing the curling of the annular periphery 36 occurs as represented by B in FIG. 13. That is, the curling of the annular periphery 36 toward the integral corner 70 and about the springs 56 occurs. In curling the annular periphery 36 toward the integral corner 70 and about the springs 56, the step of completing the curling of the annular periphery 36 is further defined by curling the annular periphery 36 at least beyond one half of a circumference of each spring 56.

Once the second step of completing the curling of the annular periphery 36 occurs, the circumferential groove 64 is recognized only as a portion of the annular periphery 36. Correspondingly, once the second step of completing the curling of the annular periphery 36 occurs, the annular periphery 36 and the circumferential groove 64 comprehensively establish the generally C-shaped channel 46 for independently retaining the springs 56.

The final curling of the annular periphery 36 into the generally C-shaped channel 46 is typically accomplished by a stamping process. However, other metal forming processes, including, but not limited to, metal spinning or force flowing of the annular periphery 36 may also be implemented. Additionally, as appreciated, these metal forming processes may also be implemented to partially curl the annular periphery 36.

With reference now to FIG. 11, the step of completing the curling of the annular periphery 36, in sum, enables independent retention of the springs 56 within the retainer plate 20. That is, the retainer plate 20 manufactured according to the subject method invention does not necessitate the incorporation of additional apparatus to retain the springs 56 within the retainer plate 20, and the torsional vibration damper assembly 24 operates optimally.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A method for manufacturing a one-piece torsional vibration damper retainer plate having an annular periphery curled into a generally C-shaped channel for retaining at least one spring, said method comprising the steps of:

partially curling the annular periphery to receive the spring;

disposing the spring about the annular periphery of the retainer plate;

completing curling of the annular periphery about the spring and forming the generally C-shaped channel after the step of partially curling to substantially surround the spring to prevent the spring from being removed from the C-shaped of the retainer plate during operation of the retainer plate; and said method characterized by heat treating the surface of the C-shaped channel to change physical properties of the retainer plate between the step of partially curling the annular periphery and the step of completing the curling of the annular periphery thereby creating a wear resistant surface layer for contact with the spring disposed within the C-shaped channel.

2. A method as set forth in claim 1 wherein the step of disposing the spring about the annular periphery is further defined by disposing a plurality of springs about the periphery of the retainer plate.

3. A method as set forth in claim 2 further comprising the step of stamping the retainer plate to form a central plate segment and a circumferential groove having radially-spaced inner and outer walls extending about the central plate segment.

4. A method as set forth in claim 3 wherein the step of stamping the retainer plate is further defined by forming radially extending abutment walls within the circumferential groove for positioning the plurality of springs within the circumferential groove.

5. A method as set forth in claim 4 wherein the step of stamping the retainer plate is further defined by forming an integral corner extending about the central plate segment and into the inner wall of the circumferential groove.

6. A method as set forth in claim 5 wherein the step of stamping the retainer plate is further defined by forming the annular periphery extending radially from the outer wall of the circumferential groove.

7. A method as set forth in claim 6 further comprising the step of wiping the annular periphery to extend axially as an extension of the outer wall of the circumferential groove.

8. A method as set forth in claim 7 further comprising the step of partially curling the annular periphery toward the integral corner prior to disposing the springs in the circumferential groove.

9. A method as set forth in claim 8 further comprising the step of completing the curling of the annular periphery toward the integral corner and about the springs.

10. A method as set forth in claim 9 wherein the step of completing the curling of the annular periphery is further defined by curling the annular periphery beyond one half of a circumference of each spring.

* * * * *

UNITED STATES PATENT AND TRADEMARK OFFICE
CERTIFICATE OF CORRECTION

PATENT NO. : 6,675,457 B1
DATED : January 13, 2004
INVENTOR(S) : Redmond et al.

Page 1 of 1

It is certified that error appears in the above-identified patent and that said Letters Patent is hereby corrected as shown below:

Column 8,
Line 2, insert -- channel -- after "C-shaped".

Signed and Sealed this

Sixth Day of April, 2004

JON W. DUDAS
*Acting Director of the United States Patent and Trademark Office*